(12) United States Patent
Perry et al.

(10) Patent No.: US 6,948,481 B2
(45) Date of Patent: Sep. 27, 2005

(54) ELECTRICAL CONNECTIONS FOR AN INTEGRATED PRESSURE MANAGEMENT APPARATUS

(75) Inventors: Paul Perry, Chatham (CA); Andre Veinotte, Dresden (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/794,029

(22) Filed: Mar. 8, 2004

(65) Prior Publication Data

US 2004/0226544 A1 Nov. 18, 2004

Related U.S. Application Data

(60) Provisional application No. 60/452,651, filed on Mar. 7, 2003.

(51) Int. Cl.$^7$ ................................................. F02M 33/02
(52) U.S. Cl. ....................... 123/518; 123/516; 123/519; 73/118.1; 137/493; 137/494; 137/554; 200/83 R; 200/83 Q
(58) Field of Search ......................... 123/516, 518–521; 73/117.2, 117.3, 118.1; 137/493, 494, 495, 554, 584; 200/83 Q, 83 R

(56) References Cited

U.S. PATENT DOCUMENTS

| | | |
|---|---|---|
| 2,157,299 A | 5/1939 | Mercier |
| 2,330,881 A | 10/1943 | Gora |
| 3,110,502 A | 11/1963 | Pagano |
| 3,129,885 A | 4/1964 | Freismuth |
| 3,516,279 A | 6/1970 | Maziarka |
| 3,586,016 A | 6/1971 | Meyn |
| 3,640,501 A | 2/1972 | Walton |
| 3,685,501 A | 8/1972 | Honda |
| 3,720,090 A | 3/1973 | Halpert et al. |
| 3,754,568 A | 8/1973 | Gallagher et al. |
| 3,802,267 A | 4/1974 | Lofink |
| 3,841,344 A | 10/1974 | Slack |
| 3,861,646 A | 1/1975 | Douglas |
| 3,871,777 A | 3/1975 | Ridler |
| 3,927,553 A | 12/1975 | Frantz |
| 4,009,985 A | 3/1977 | Hirt |
| 4,136,854 A | 1/1979 | Ehmig et al. |
| 4,164,168 A | 8/1979 | Tateoka |

(Continued)

FOREIGN PATENT DOCUMENTS

| | | |
|---|---|---|
| DE | 3907 408 | 9/1990 |
| EP | 0 462 824 | 12/1991 |
| EP | 0 604 285 | 6/1994 |
| EP | 0 688 691 | 12/1995 |
| WO | WO 99 50551 | 10/1999 |
| WO | WO 01 387 16 | 5/2001 |

OTHER PUBLICATIONS

U.S. Appl. No. 09/565,028, filed May 5, 2000, Perry et al., Method of Managing Pressure in a Fuel System.

*Primary Examiner*—Weilun Lo

(57) ABSTRACT

An apparatus, system and method of establishing a threshold for a leak detection test that is performed on a headspace of a fuel system. A fuel vapor pressure management apparatus includes a housing, a pressure operable device, and a sensor. The housing defines an interior chamber. The pressure operable device separates the interior chamber into first and second portions, and includes a poppet that moves along an axis and a seal that is adapted to cooperatively engage the poppet. A first arrangement of the pressure operable device occurs during the leak detection test when the seal is in a first deformed configuration. A sensor detects the first arrangement of the pressure operable device during the leak detection test. And a processor is coupled to the sensor and reduces sensitivity of the fuel vapor pressure management apparatus during the leak detection test.

19 Claims, 4 Drawing Sheets

U.S. PATENT DOCUMENTS

| | | | |
|---|---|---|---|
| 4,166,485 A | | 9/1979 | Wokas |
| 4,215,846 A | | 8/1980 | Ishizuka et al. |
| 4,219,710 A | * | 8/1980 | Booth ...................... 200/81 R |
| 4,240,467 A | | 12/1980 | Blatt et al. |
| 4,244,554 A | | 1/1981 | DiMauro et al. |
| 4,354,383 A | | 10/1982 | Härtel |
| 4,368,366 A | * | 1/1983 | Kitamura et al. ......... 200/83 Q |
| 4,422,242 A | | 12/1983 | Stocker |
| 4,474,208 A | | 10/1984 | Looney |
| 4,494,571 A | | 1/1985 | Seegers et al. |
| 4,518,329 A | | 5/1985 | Weaver |
| 4,561,297 A | | 12/1985 | Holland |
| 4,616,114 A | | 10/1986 | Strasser |
| 4,717,117 A | | 1/1988 | Cook |
| 4,766,557 A | | 8/1988 | Twerdochlib |
| 4,766,927 A | | 8/1988 | Conatser |
| 4,852,054 A | | 7/1989 | Mastandrea |
| 4,901,559 A | | 2/1990 | Grabner |
| 4,905,505 A | | 3/1990 | Reed |
| 4,922,957 A | | 5/1990 | Johnson |
| 4,925,157 A | | 5/1990 | Troy |
| 5,036,823 A | | 8/1991 | MacKinnon |
| 5,058,232 A | | 10/1991 | Stohr |
| 5,069,188 A | | 12/1991 | Cook |
| 5,090,234 A | | 2/1992 | Maresca, Jr. et al. |
| 5,096,029 A | | 3/1992 | Bauer et al. |
| 5,101,710 A | | 4/1992 | Baucom |
| 5,115,785 A | | 5/1992 | Cook |
| 5,116,257 A | | 5/1992 | Szlaga |
| 5,152,360 A | | 10/1992 | Haefner et al. |
| 5,191,870 A | | 3/1993 | Cook |
| 5,193,512 A | | 3/1993 | Steinbrenner et al. |
| 5,209,210 A | | 5/1993 | Ikeda et al. |
| 5,211,151 A | | 5/1993 | Nakajima et al. |
| 5,253,629 A | | 10/1993 | Fornuto et al. |
| 5,259,424 A | | 11/1993 | Miller et al. |
| 5,263,462 A | | 11/1993 | Reddy |
| 5,263,685 A | | 11/1993 | Winnike et al. |
| 5,273,071 A | | 12/1993 | Oberrecht |
| 5,317,909 A | | 6/1994 | Yamada et al. |
| 5,327,934 A | | 7/1994 | Thompson |
| 5,337,262 A | | 8/1994 | Luthi et al. |
| 5,367,997 A | | 11/1994 | Kawamura et al. |
| 5,372,032 A | | 12/1994 | Filippi et al. |
| 5,375,455 A | | 12/1994 | Maresca, Jr. et al. |
| 5,388,613 A | | 2/1995 | Krüger |
| 5,390,643 A | | 2/1995 | Sekine |
| 5,390,645 A | | 2/1995 | Cook et al. |
| 5,415,033 A | | 5/1995 | Maresca, Jr. et al. |
| 5,429,097 A | | 7/1995 | Wojts-Saary et al. |
| 5,437,257 A | | 8/1995 | Giacomazzi et al. |
| 5,448,980 A | | 9/1995 | Kawamura et al. |
| 5,474,050 A | | 12/1995 | Cook et al. |
| 5,507,176 A | | 4/1996 | Kammeraad et al. |
| 5,524,662 A | | 6/1996 | Benjey et al. |
| 5,564,306 A | | 10/1996 | Miller |
| 5,579,742 A | | 12/1996 | Yamazaki et al. |
| 5,584,271 A | | 12/1996 | Sakata |
| 5,603,349 A | | 2/1997 | Harris |
| 5,614,665 A | | 3/1997 | Curran et al. |
| 5,635,630 A | | 6/1997 | Dawson et al. |
| 5,644,072 A | | 7/1997 | Chirco et al. |
| 5,671,718 A | | 9/1997 | Curran et al. |
| 5,681,151 A | | 10/1997 | Wood |
| 5,687,633 A | | 11/1997 | Eady |
| 5,743,169 A | | 4/1998 | Yamada |
| 5,803,056 A | | 9/1998 | Cook et al. |
| 5,826,566 A | | 10/1998 | Isobe et al. |
| 5,863,025 A | | 1/1999 | Noya |
| 5,878,729 A | | 3/1999 | Covert et al. |
| 5,884,609 A | | 3/1999 | Kawamoto et al. |
| 5,893,389 A | | 4/1999 | Cunningham |
| 5,894,784 A | | 4/1999 | Bobbitt, III et al. |
| 5,911,209 A | | 6/1999 | Kouda et al. |
| 5,974,861 A | | 11/1999 | Cook et al. |
| 5,979,869 A | | 11/1999 | Hiddessen |
| 6,003,499 A | | 12/1999 | Devall et al. |
| 6,053,151 A | | 4/2000 | Cook et al. |
| 6,073,487 A | | 6/2000 | Dawson |
| 6,086,014 A | | 7/2000 | Bragg, Jr. |
| 6,089,081 A | | 7/2000 | Cook et al. |
| 6,142,062 A | | 11/2000 | Streitman |
| 6,145,430 A | | 11/2000 | Able et al. |
| 6,168,168 B1 | | 1/2001 | Brown |
| 6,202,688 B1 | | 3/2001 | Khadim |
| 6,203,022 B1 | | 3/2001 | Struschka et al. |
| 6,282,945 B1 | * | 9/2001 | Weldon et al. .................. 73/40 |
| 6,328,021 B1 | | 12/2001 | Perry et al. |
| 6,343,505 B1 | | 2/2002 | Cook et al. |
| 6,450,153 B1 | | 9/2002 | Perry |
| 6,453,942 B1 | | 9/2002 | Perry |
| 6,460,566 B1 | | 10/2002 | Perry et al. |
| 6,470,861 B1 | | 10/2002 | Perry |
| 6,470,908 B1 | | 10/2002 | Perry |
| 6,474,313 B1 | | 11/2002 | Perry et al. |
| 6,474,314 B1 | | 11/2002 | Perry et al. |
| 6,478,045 B1 | | 11/2002 | Perry |
| 6,481,415 B1 | | 11/2002 | Cook |
| 6,484,555 B1 | | 11/2002 | Perry et al. |
| 6,502,560 B1 | | 1/2003 | Perry |
| 6,505,514 B1 | | 1/2003 | Perry |
| 6,526,951 B2 | * | 3/2003 | Ishigaki et al. ............. 123/519 |
| 6,546,779 B2 | | 4/2003 | Oliver |
| 6,623,012 B1 | | 9/2003 | Perry et al. |
| 6,708,552 B2 | | 3/2004 | Weldon |
| 6,772,739 B2 | * | 8/2004 | Veinotte et al. ............. 123/516 |
| 2003/0000289 A1 | | 1/2003 | Weldon |

* cited by examiner

ELECTRICAL CONNECTIONS FOR AN INTEGRATED PRESSURE MANAGEMENT APPARATUS

CROSS REFERENCE TO RELATED APPLICATIONS

This application claims the benefit of the earlier filing date of U.S. Provisional Application No. 60/452,651, filed 7 Mar. 2003, which is incorporated by reference herein in its entirety.

FIELD OF THE INVENTION

A fuel vapor pressure management apparatus that manages pressure and detects leaks in a fuel system. In particular, a fuel vapor pressure management apparatus that vents positive pressure, vents excess negative pressure, and uses evaporative natural vacuum to perform a leak diagnostic.

BACKGROUND OF THE INVENTION

A known fuel system for vehicles with internal combustion engines includes a canister that accumulates fuel vapor from a headspace of a fuel tank. If there is a leak in the fuel tank, the canister, or any other component of the fuel system, fuel vapor could escape through the leak and be released into the atmosphere instead of being accumulated in the canister. Various government regulatory agencies, e.g., the U.S. Environmental Protection Agency and the Air Resources Board of the California Environmental Protection Agency, have promulgated standards related to limiting fuel vapor releases into the atmosphere. Thus, it is believed that there is a need to avoid releasing fuel vapors into the atmosphere, and to provide an apparatus and a method for performing a leak diagnostic, so as to comply with these standards.

It is believed that excess fuel vapor can accumulate immediately after engine shutdown, thereby creating a positive pressure in the fuel system. Excess negative pressure in closed fuel systems can occur under some operating and atmospheric conditions, thereby causing stress on components of these fuel systems. Thus, it is believed that there is a need to vent, or "blow-off," the positive pressure, and to vent, or "relieve," the excess negative pressure. Similarly, it is also believed to be desirable to relieve excess positive pressure that can occur during tank refueling. Thus, it is believed that there is a need to allow air, but not fuel vapor, to exit the tank at high flow rates during tank refueling. This is commonly referred to as onboard refueling vapor recovery (ORVR).

SUMMARY OF THE INVENTION

The present invention provides a fuel vapor pressure management apparatus including a housing, a pressure operable device, a switch, an outlet terminal fixed to the housing, and an intermediate lead member. The housing defines an interior chamber and includes first and second ports that communicate with the interior chamber. The pressure operable device separates the chamber into a first portion and a second portion. The first portion communicates with the first port, and the second portion communicates with the second port. The pressure operable device permits fluid communication between the first and second ports in a first configuration, and prevents fluid communication between the first and second ports in a second configuration. The switch signals displacement of the pressure operable device in response to negative pressure at a first pressure level in the first portion of the interior chamber. And the intermediate lead member, which includes a resilient element, electrically couples the switch and the outlet terminal.

The present invention also provides a fuel system for supplying fuel to an internal combustion engine. The fuel system includes a fuel tank having a headspace, a fuel vapor collection canister, an intake manifold of the internal combustion engine, a purge valve, and a fuel vapor pressure management apparatus. The fuel vapor collection canister has a first side being in fluid communication with the headspace, and has a second side. The purge valve includes an inlet and an outlet. The inlet is in fluid communication with the first side of the fuel vapor collection canister, and the outlet is in fluid communication with the intake manifold. The fuel vapor pressure management apparatus includes a first port that is in fluid communication with the second side of the fuel vapor collection canister, and a second port that is in fluid communication with atmosphere. A first arrangement of the fuel vapor pressure management apparatus occurs when there is a first negative pressure level in the fuel vapor collection canister relative to atmosphere, a second arrangement of the fuel vapor pressure management apparatus permits a first fluid flow from atmosphere to the fuel vapor collection canister when there is a second negative pressure level less than the first negative pressure level, and a third arrangement of the fuel vapor pressure management apparatus permits a second fluid flow from the fuel vapor collection canister to atmosphere when there is a positive pressure in the fuel vapor collection canister relative to atmosphere. The fuel vapor pressure management apparatus includes a housing, a pressure operable device, a switch, an outlet terminal fixed to the housing, and an intermediate lead member. The housing defines an interior chamber that is in fluid communication with the first and second ports. The pressure operable device separates the chamber into a first portion that communicates with the first port, and a second portion that communicates with the second port. The pressure operable device prevents fluid communication between the first and second ports in the first arrangement, and the pressure operable device permits fluid communication between the first and second ports in the second and third arrangements. The switch signals displacement of the pressure operable device in response to the first negative pressure level, and the intermediate lead member, which includes a resilient element, electrically couples the switch and the outlet terminal.

The present invention further provides a method of assembling a fuel vapor pressure management apparatus. The fuel vapor pressure management apparatus includes a housing that has a main body piece and first and second cover pieces, an outlet terminal that is fixed to the first cover piece, and a cover terminal that is fixed to the second cover piece and electrically coupled to a switch. The method includes attaching the first cover piece to the main body piece such that the outlet terminal projects into the main body piece, positioning in the main body an intermediate lead member, and attaching the second cover piece to the main body piece. The intermediate lead member includes a first end that is contiguously engaged with and is electrically coupled with the outlet terminal, and a second end portion. The attaching the second cover piece to the main body piece causes the cover terminal to project into the main body piece, and the cover terminal engages the second end of the intermediate lead member and resiliently deforms the intermediate lead member.

BRIEF DESCRIPTION OF THE DRAWINGS

The accompanying drawings, which are incorporated herein and constitute part of this specification, illustrate

DETAILED DESCRIPTION OF THE PREFERRED EMBODIMENT

As it is used in this description, "atmosphere" generally refers to the gaseous envelope surrounding the Earth, and "atmospheric" generally refers to a characteristic of this envelope.

As it is used in this description, "pressure" is measured relative to the ambient atmospheric pressure. Thus, positive pressure refers to pressure greater than the ambient atmospheric pressure and negative pressure, or "vacuum," refers to pressure less than the ambient atmospheric pressure.

Also, as it is used in this description, "headspace" refers to the variable volume within an enclosure, e.g. a fuel tank, that is above the surface of the liquid, e.g., fuel, in the enclosure. In the case of a fuel tank for volatile fuels, e.g., gasoline, vapors from the volatile fuel may be present in the headspace of the fuel tank.

Figure 1:
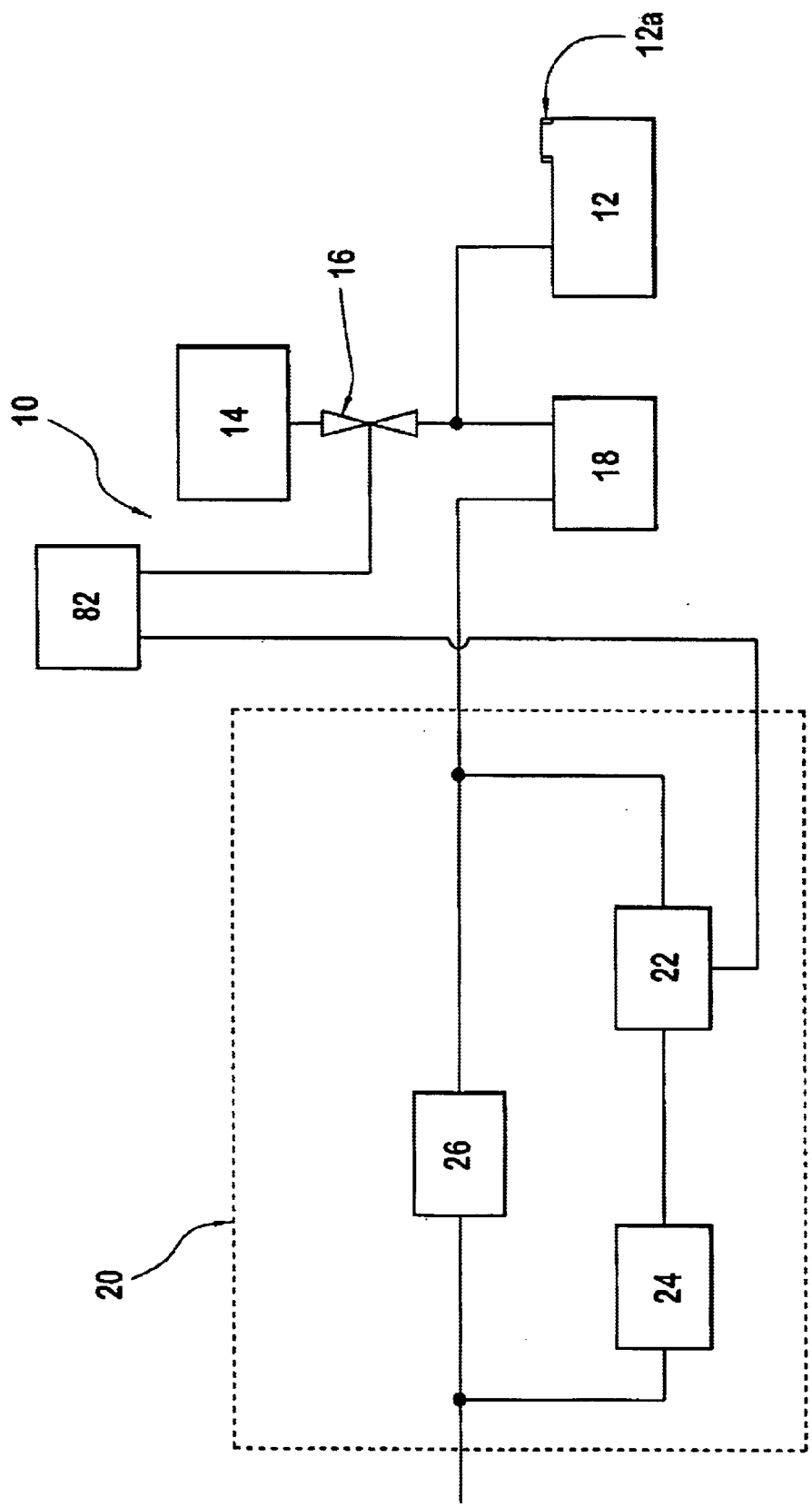
FIG. 1 is a schematic illustration showing a fuel system including an integrated pressure management apparatus according to the present invention.

Referring to FIG. 1, a fuel system 10, e.g., for an engine (not shown), includes a fuel tank 12, a vacuum source 14 such as an intake manifold of the engine, a purge valve 16, a fuel vapor collection canister 18 (also referred to as a "charcoal canister"), and an integrated pressure management apparatus (IPMA) 20.

The IPMA 20 performs a plurality of functions including signaling 22 that a first predetermined pressure (vacuum) level exists in the headspace of the fuel system 10, relieving pressure 24 (also referred to as relieving excess vacuum) in the headspace of the fuel system 10 at a value below the first predetermined pressure level, and relieving pressure 26 (also referred to as pressure blow-off) in the headspace of the fuel system 10 above a second pressure level. Relieving pressure 24,26 refers to the relieving pressure in the fuel vapor collection canister 18 and throughout the headspace of the fuel system 10 relative to the ambient atmospheric pressure A.

In the course of cooling that is experienced by the fuel system 10, e.g., after the engine is turned off, a vacuum is created in the fuel vapor collection canister 18. The existence of a vacuum at the first predetermined pressure level indicates that the integrity of the fuel system 10 is satisfactory. Thus, signaling 22 is used for indicating the integrity of the fuel system 10, i.e., that there are no appreciable leaks. Subsequently relieving pressure 24 at a pressure level below the first predetermined pressure level protects the integrity of the fuel tank 12, i.e., prevents it from collapsing due to vacuum in the fuel system 10.

Immediately after the engine is turned off, relieving pressure 26 allows excess pressure due to fuel vaporization to blow off, thereby facilitating the desired vacuum generation that occurs during cooling. During pressure blow-off, air within the fuel system 10 is released while fuel molecules are retained in the fuel vapor collection canister 18. Similarly, in the course of refueling the fuel tank 12, relieving pressure 26 allows air to exit the fuel tank 12 at high flow.

While the engine is turned on, controllably connecting the fuel vapor collection canister 18 to the ambient air A allows confirmation of the purge flow and allows confirmation of the signaling 22 performance.

Figure 2:
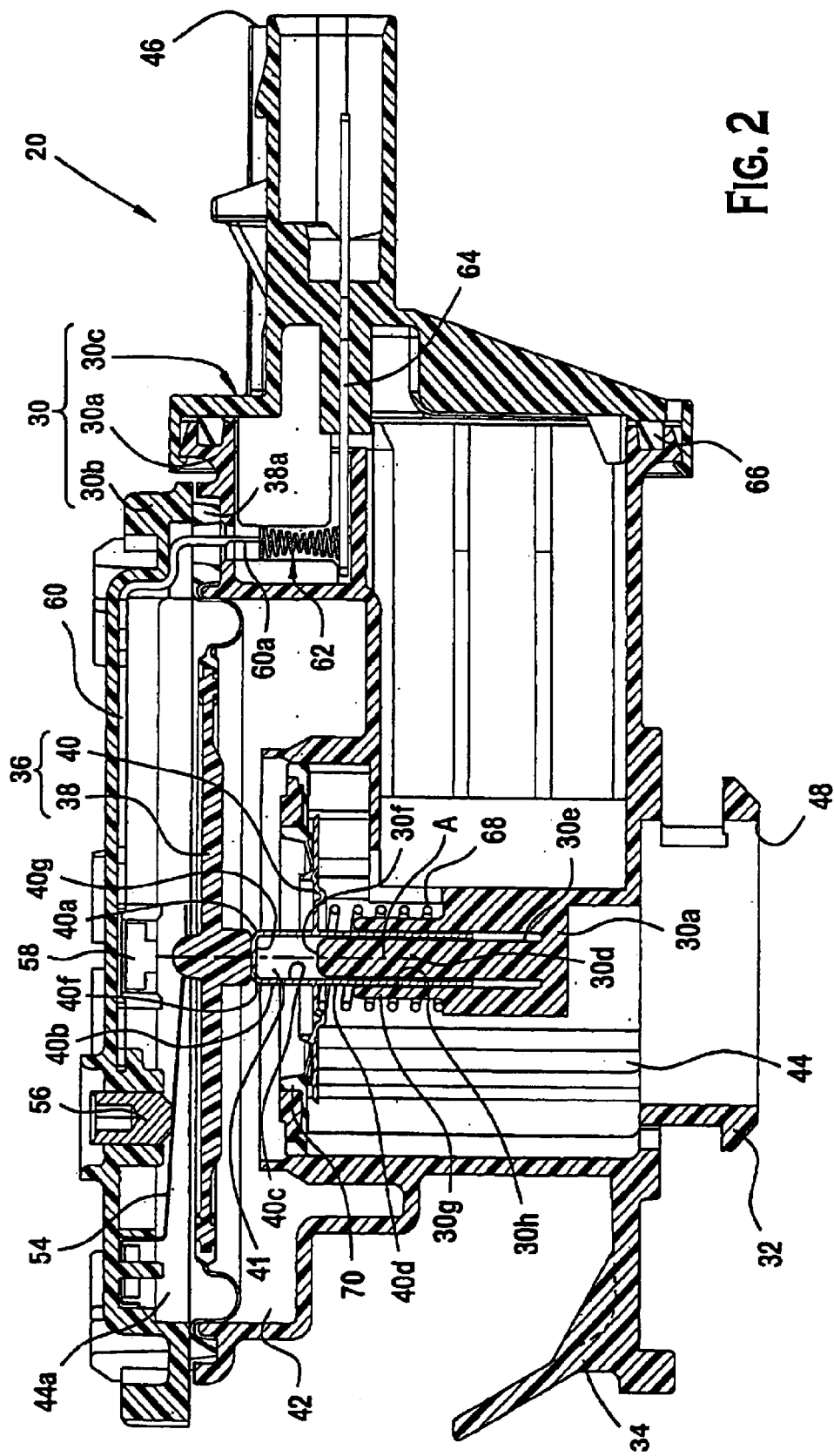
FIG. 2 is a cross-sectional view of a preferred embodiment of an integrated pressure management apparatus according to the present invention.

FIG. 2 shows a preferred embodiment of the IPMA 20 mounted on the fuel vapor collection canister 18. The IPMA 20 includes a housing 30 that can be mounted to the body of the fuel vapor collection canister 18 by a bayonet style attachment 32. A seal is interposed between the fuel vapor collection canister 18 and the IPMA 20. This attachment 32, in combination with a snap finger 34, allows the IPMA 20 to be readily serviced in the field. Of course, different styles of attachments between the IPMA 20 and the body 18 can be substituted for the illustrated bayonet attachment 32, e.g., a threaded attachment, an interlocking telescopic attachment, etc. Alternatively, the fuel vapor collection canister 18 and the housing 30 can be integrally formed from a common homogenous material, can be permanently bonded together (e.g., using an adhesive), or the fuel vapor collection canister 18 and the housing 30 can be interconnected via an intermediate member such as a pipe or a flexible hose.

The housing 30 can be an assembly of a main housing piece 30a and housing piece covers 30b and 30c. Although two housing piece covers 30b,30c have been illustrated, it is desirable to minimize the number of housing pieces to reduce the number of potential leak points, i.e., between housing pieces, which must be sealed. Minimizing the number of housing piece covers depends largely on the fluid flow path configuration through the main housing piece 30a and the manufacturing efficiency of incorporating the necessary components of the IPMA 20 via the ports of the flow path. Additional features of the housing 30 and the incorporation of components therein will be further described below.

Signaling 22 occurs when vacuum at the first predetermined pressure level is present in the fuel vapor collection canister 18. A pressure operable device 36 separates an interior chamber in the housing 30. The pressure operable device 36, which includes a diaphragm 38 that is operatively interconnected to a valve 40, separates the interior chamber of the housing 30 into an upper portion 42 and a lower portion 44. The upper portion 42 is in fluid communication with the ambient atmospheric pressure through a first port 46. The lower portion 44 is in fluid communication with a second port 48 between housing 30 the fuel vapor collection canister 18.

The lower portion 44 is also in fluid communicating with a separate portion 44a via a signal passageway that extends through spaces in the housing 30, and through spaces between the intermediate lead frame 62 and the housing 30. Sealing between the housing pieces 30a,30b for the signal passageway can be provided by a protrusion 38a of the diaphragm 38 that is penetrated by the signal passageway.

The force created as a result of vacuum in the separate portion 44a causes the diaphragm 38 to be displaced toward the housing part 30b. This displacement is opposed by a resilient element 54, e.g., a leaf spring. A calibrating screw 56 can adjust the bias of the resilient element 54 such that a desired level of vacuum, e.g., a fraction of an inch of water, will depress a switch 58 that can be mounted on a printed circuit board 60. As vacuum is released, i.e., the pressure in the portions 44,44a rises, the resilient element 54 pushes the diaphragm 38 away from the switch 58, whereby the switch 58 resets.

The printed circuit board 60 is electrically interconnected to an outlet terminal 64 that is supported by the housing piece cover 30c. The electrical interconnect for each conductor can include a cover terminal 60a projecting from the printed circuit board 60, and an intermediate lead member 62 electrically coupling the cover terminal 60a with a corresponding outlet terminal 64. The cover terminal 60a can also, similar to the signal passageway, penetrate the protrusion 38a of the diaphragm 38. The intermediate lead member 62 includes a resilient piece that ensures electrical coupling between the cover terminal 60a and the outlet terminal 64.

Figure 3:
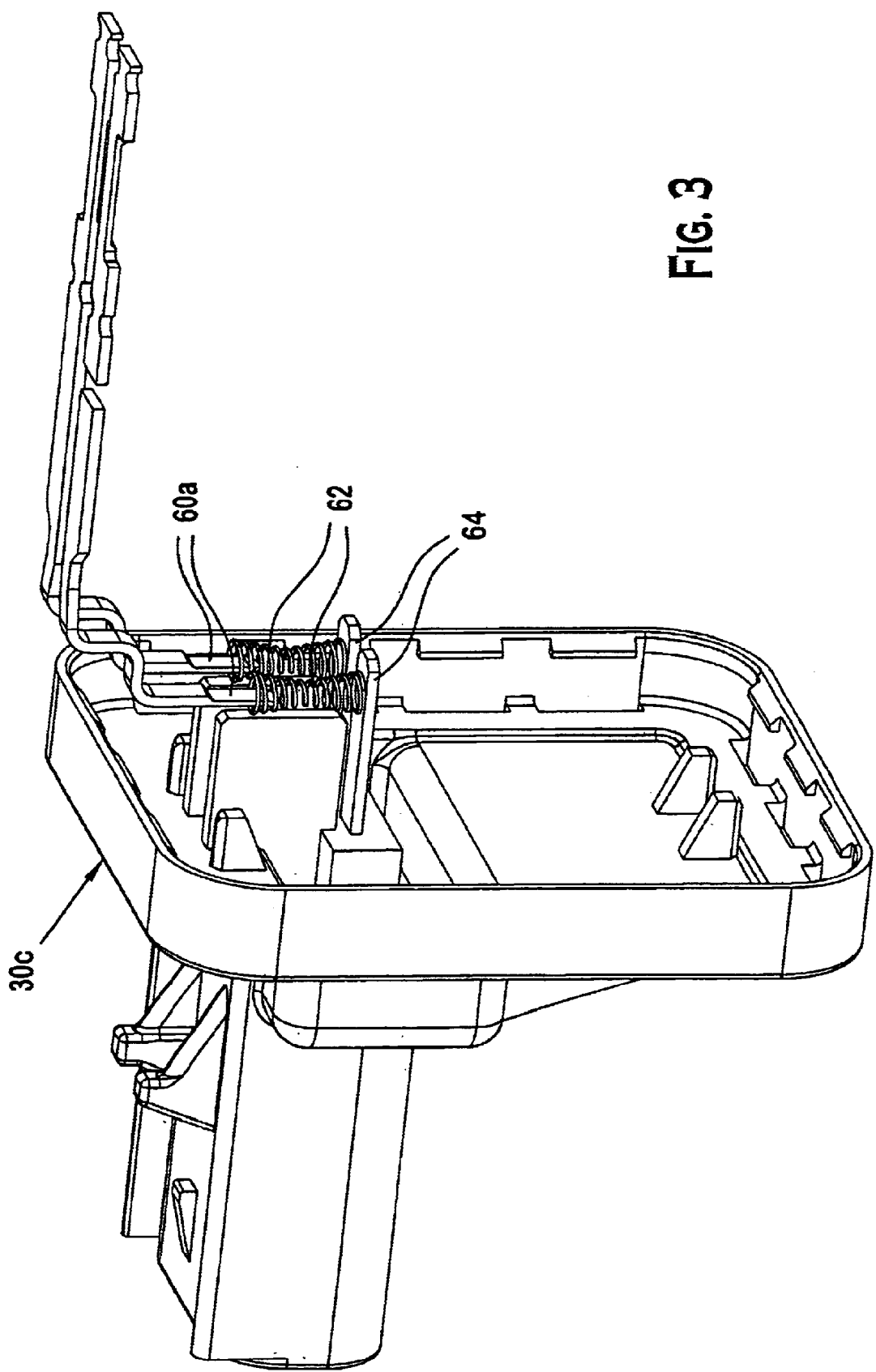
FIG. 3 is a perspective view showing components of the integrated pressure management apparatus. Portions of the integrated pressure management apparatus have been omitted to facilitate understanding of the present invention.
Figure 4:
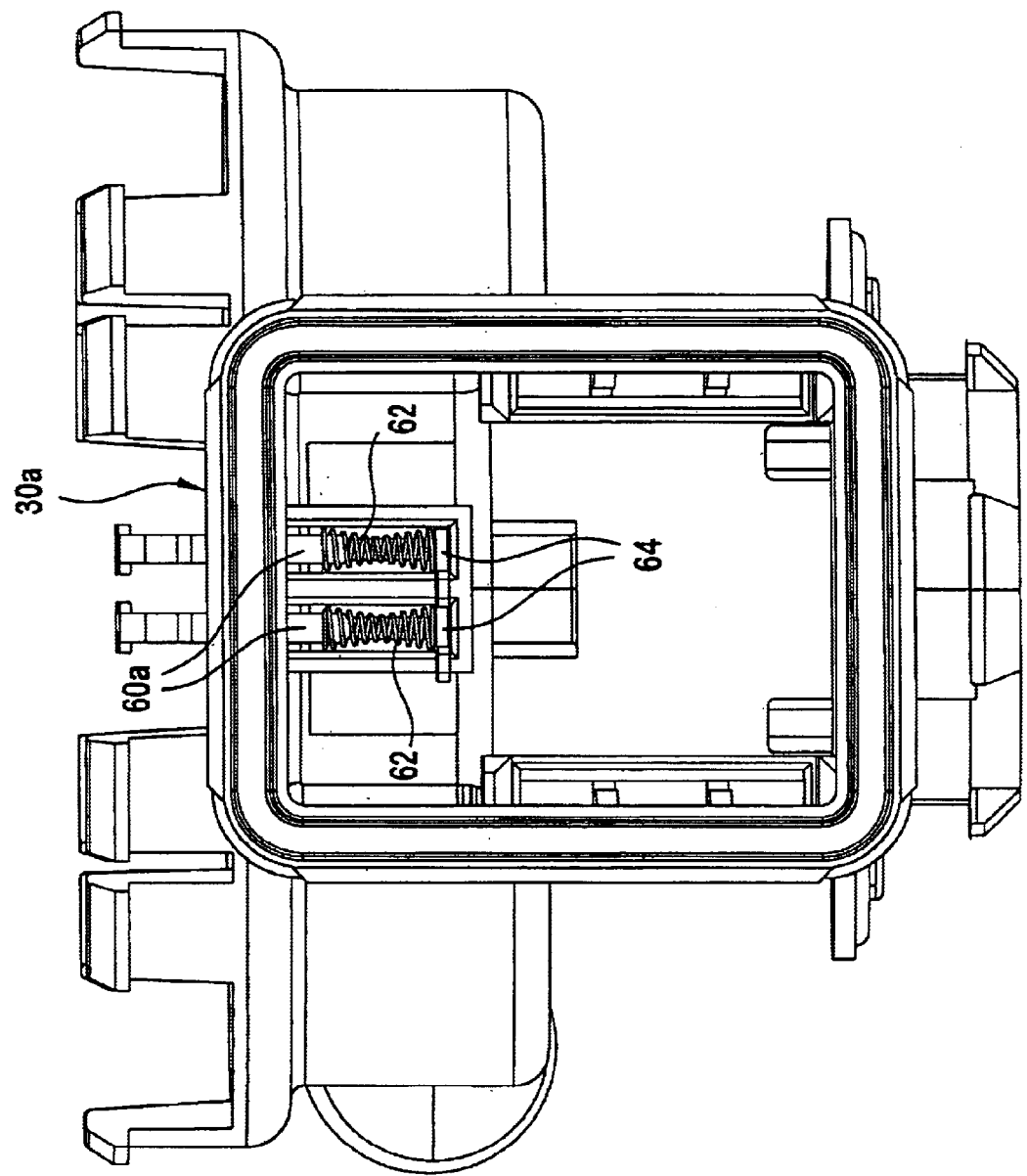
FIG. 4 is an alternate perspective view of the components shown in FIG. 3.

Referring additionally to FIGS. 3 and 4, a preferred embodiment of the electrical interconnect allows connection of the outlet terminal 64 to the switch 58 via a set of electrically conductive and resilient intermediate lead members 62, e.g., two coil springs. The intermediate lead members 62 are resilient in that elastic deformation, which results in reshaping, resizing, or repositioning of the intermediate lead members 62, is relied upon to grip or forcibly press against the cover and outlet terminals 60a,64.

An engine control unit 82 is electrically coupled to the switch 58, via the outlet terminal 64 and the intermediate lead member 62, and to the purge valve 16.

A manufacturing assembly sequence in accordance with the present invention will now be described. First, the housing piece cover 30c with insert molded outlet terminals 64 is sub-assembled with the main housing piece 30a. An O-ring 66 can seal the housing piece cover 30c with respect to the main housing piece 30a. The inner ends of the outlet terminals 64 are supported underneath by support walls (not shown) that project inward from the housing cover piece 30c. Next, electrically conductive, resilient intermediate lead members 62, e.g., coil springs, are inserted vertically through access holes in the main housing piece 30a. Preferably, after the resilient intermediate lead members 62 are inserted, the diaphragm 38 can be positioned with respect to the main housing piece 30a. Then the housing cover piece 30b is attached to the sub-assembled combination of the housing piece cover 30c and the main housing piece 30a. In the process of attaching the housing cover piece 30b, the cover terminal end 60a enters into an end, which may be flared, of the intermediate lead member springs 62. The entry of the terminal end 60a acts to expand the intermediate lead member spring 62. With the housing cover piece 30b in its final position, each of the intermediate lead member springs 62 springs may also be compressed to approximately 50% of its free length. Compressing the intermediate lead member springs 62 acts to make a secure electrical connection at the lower end of the spring 62 to the outlet terminals 64. This electrical connection is believed to be vibration and shock tolerant, when used in a fuel vapor pressure management apparatus that is mounted on a vehicle, since the elastic force supplied by the intermediate lead member springs 62 is continually acting to create the connection.

According to a preferred embodiment, the intermediate lead member springs 62 may have a generally symmetrical hourglass shape, e.g., flared end portions and a relatively constricted central portion. Such a shape provides at least two advantages. First, the flared end portions help to guide the cover terminals 60a into the center of the intermediate lead member springs 62. Second, the taper of the intermediate lead member springs 62 and the taper of the cover terminals 60a interact to effectively wedge the two components securely together. It should also be noted that the intermediate lead member springs 62 may be restrained on all four sides by walls (not shown) that protrude from the main housing piece 30a.

Pressure relieving 24 occurs as vacuum in the portions 44,44a increases, i.e., the pressure decreases below the calibration level for actuating the switch 58. Vacuum in the fuel vapor collection canister 18 and the lower portion 44 will continually act on the valve 40 inasmuch as the upper portion 42 is always at or near the ambient atmospheric pressure A. At some value of vacuum below the first predetermined level, e.g., one inch of water, this vacuum will overcome the opposing force of a second resilient element 68 and displace the valve 40 away from a lip seal 70. This displacement will open the valve 40 from its closed configuration, thus allowing ambient air to be drawn through the upper portion 42 into the lower the portion 44. That is to say, in an open configuration of the valve 40, the first and second ports 46,48 are in fluid communication. In this way, vacuum in the fuel system 10 can be regulated.

Relieving pressure 26 is provided when there is a positive pressure in the lower portion 44, e.g., when the tank 12 is being refueled. Specifically, the valve 40 is displaced to its open configuration to provide a very low restriction path for escaping air from the tank 12. When the fuel vapor collection canister 18, and hence the lower portions 44, experience positive pressure above ambient atmospheric pressure, the signal passageway communicates this positive pressure to the separate portion 44a. In turn, this positive pressure displaces the diaphragm 38 downward toward the valve 40. A diaphragm pin transfers the displacement of the diaphragm 38 to the valve 40, thereby displacing the valve 40 to its open configuration with respect to the lip seal 70. Thus, pressure in the fuel vapor collection canister 18, e.g., due to refueling, is allowed to escape through the lower portion 44, past the lip seal 70, through the upper portion 42, and through the second port 58.

Relieving pressure 26 is also useful for regulating the pressure in fuel tank 12 during any situation in which the engine is turned off. By limiting the amount of positive pressure in the fuel tank 12, the cool-down vacuum effect will take place sooner.

The present invention has many advantages, including:
  providing relief for positive pressure above a first predetermined pressure value, and providing relief for vacuum below a second predetermined pressure value.
  vacuum monitoring with the present invention in its open configuration during natural cooling, e.g., after the engine is turned off, provides a leak detection diagnostic.
  vacuum relief provides fail-safe operation of the purge flow system in the event that the solenoid fails with the valve in a closed configuration.
  excluding from the fuel vapor management apparatus an electromechanical actuator that would consume electrical power.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A fuel vapor pressure management apparatus, comprising:
   a housing defining an interior chamber, the housing including first and second ports communicating with the interior chamber;
   a pressure operable device separating the chamber into a first portion and a second portion, the first portion communicating with the first port, the second portion communicating with the second port, the pressure operable device permitting fluid communication between the first and second ports in a first configuration and preventing fluid communication between the first and second ports in a second configuration;
   a switch signaling displacement of the pressure operable device in response to negative pressure at a first pressure level in the first portion of the interior chamber;
   an outlet terminal fixed to the housing; and
   an intermediate lead member electrically coupling the switch and the outlet terminal, the intermediate lead member including a resilient element.

2. The fuel vapor pressure management apparatus according to claim 1, wherein the resilient element comprises a coil spring extending between first and second end portions, at least one of the first end portion and the second end portion presses contiguously against the outlet terminal.

3. The fuel vapor pressure management apparatus according to claim 1, wherein the housing comprises a main body piece, a first cover piece, and a second cover piece.

4. The fuel vapor pressure management apparatus according to claim 3, further comprising:
   a cover terminal being fixed to the first cover piece, the cover terminal being electrically coupled to the switch; and
   the outlet terminal being fixed to the second cover piece.

5. The fuel vapor pressure management apparatus according to claim 4, wherein the switch is fixed to the first cover piece.

6. The fuel vapor pressure management apparatus according to claim 4, further comprising:
   a printed circuit board electrically coupling the switch and the cover terminal, the switch being fixed to the printed circuit board, the printed circuit board being fixed to the first cover piece, and the cover terminal projecting from the printed circuit board.

7. The fuel vapor pressure management apparatus according to claim 4, wherein the resilient element extends between and electrically couples the cover terminal and the outlet terminal.

8. The fuel vapor pressure management apparatus according to claim 7, wherein the resilient element comprises a coil spring extending between first and second end portions, the first end portion receives therein the cover terminal, and the second end portion presses contiguously against the outlet terminal.

9. The fuel vapor pressure management apparatus according to claim 8, wherein the resilient element further comprises an intermediate portion coupling the first and second end portions, the intermediate portion being constricted relative to the first end portion such that the cover terminal passes through an opening defined by the first end portion and engages an inner periphery of the intermediate portion.

10. The fuel vapor pressure management apparatus according to claim 9, wherein the intermediate portion is constricted relative to the second end portion.

11. The fuel vapor pressure management apparatus according to claim 8, wherein the coil spring is compressed between the cover terminal and the outlet terminal.

12. The fuel vapor pressure management apparatus according to claim 11, wherein the coil spring has a compressed length that is approximately 50% of its uncompressed length.

13. A fuel system for supplying fuel to an internal combustion engine, the fuel system comprising:
   a fuel tank having a headspace;
   a fuel vapor collection canister having first and second sides, the first side being in fluid communication with the headspace;
   an intake manifold of the internal combustion engine;
   a purge valve including an inlet and an outlet, the inlet being in fluid communication with the first side of the fuel vapor collection canister and the outlet being in fluid communication with the intake manifold; and
   a fuel vapor pressure management apparatus including first and second ports, the first port being in fluid communication with the second side of the fuel vapor collection canister, and the second port being in fluid communication with atmosphere, a first arrangement of the fuel vapor pressure management apparatus occurs when there is a first negative pressure level in the fuel vapor collection canister relative to atmosphere, a second arrangement of the fuel vapor pressure management apparatus permits a first fluid flow from atmosphere to the fuel vapor collection canister when there is a second negative pressure level less than the first negative pressure level, and a third arrangement of the fuel vapor pressure management apparatus permits a second fluid flow from the fuel vapor collection canister to atmosphere when there is a positive pressure in the fuel vapor collection canister relative to atmosphere, the fuel vapor pressure management apparatus including:
   a housing defining an interior chamber in fluid communication with the first and second ports;
   a pressure operable device separating the chamber into a first portion and a second portion, the first portion communicating with the first port, the second portion communicating with the second port, the pressure operable device preventing fluid communication between the first and second ports in first arrangement, and the pressure operable device permitting fluid communication between the first and second ports in the second and third arrangements;
   a switch signaling displacement of the pressure operable device in response to the first negative pressure level;
   an outlet terminal fixed to the housing; and
   an intermediate lead member electrically coupling the switch and the outlet terminal, the intermediate lead member including a resilient element.

14. The fuel system according to claim 13, further comprising:
   an engine control unit electrically coupled to the switch via the outlet terminal and the intermediate lead member.

15. The fuel system according to claim 14, wherein the engine control unit is electrically coupled to the purge valve.

16. The fuel system according to claim 15, wherein the fuel vapor pressure management apparatus excludes an electromechanical actuator.

17. A method of assembling a fuel vapor pressure management apparatus, the fuel vapor pressure management apparatus including a housing having a main body piece and first and second cover pieces, an outlet terminal being fixed to the first cover piece, and a cover terminal fixed to the second cover piece and electrically coupled to the switch, the method comprising:

attaching the first cover piece to the main body piece such that the outlet terminal projects into the main body piece;

positioning in the main body an intermediate lead member including first and second end portions, the first end of the intermediate lead member contiguously engaging and being electrically coupled with the outlet terminal; and attaching the second cover piece to the main body piece such that the cover terminal projects into the main body piece, the cover terminal engaging the second end of the intermediate lead member and resiliently deforming the intermediate lead member.

18. The method according to claim 17, wherein the attaching the first cover piece, the positioning, and the attaching the second cover piece comprise an electrically coupling between the switch and the outlet terminal.

19. The method according to claim 17, wherein the positioning comprises inserting a coil spring into the main body.

* * * * *